UNITED STATES PATENT OFFICE.

EDUARD WEIS, OF WIESENTHAL, BOHEMIA, AUSTRIA-HUNGARY.

PROCESS OF CUTTING VERY THIN PARTS UPON GLASS ARTICLES.

SPECIFICATION forming part of Letters Patent No. 364,324, dated June 7, 1887.

Application filed November 26, 1886. Serial No. 219,953. (No specimens.) Patented in France May 22, 1886, No. 176,298.

*To all whom it may concern:*

Be it known that I, EDUARD WEIS, of the city of Wiesenthal, Bohemia, Austria-Hungary, have invented a new and useful Improved Process of Cutting Very Thin Parts upon Glass Articles, (for which I have obtained Letters Patent in France, dated May 22, 1886, No. 176,298,) of which the following is a full, clear, and exact description.

My invention has for its object to allow cutting of very thin parts upon glass articles—such as goblets, beads, or the like—without any danger of injuring or breaking the said articles while ornaments, letters, &c., are being cut into them.

According to my invention I coat the article to be cut with a cement or composition, which must be hard when dry, which cement may be easily taken off when desired, either by the action of a solvent or being submitted to the action of heat to a suitable degree of temperature.

The substances which may be employed in these conditions as a cement are chiefly shellac, rosins, colophony, pitch, glue, gelatine, &c.

Glass articles coated in this manner may be cut in the ordinary way, as this coat does not hinder the process of cutting; but when the article is very thin and frail, or becomes so during the cutting operation, the cement, being hard, strengthens the same, thereby preventing the danger of breakage, to which frail articles to be cut are subjected when not so coated.

In order that small objects may be more easily handled during the process of cutting, they may be fixed upon a supporting-plate in the ordinary manner while being covered with the cement.

It will be readily understood that when articles are to be cut upon all their faces or sides a fresh coating of cement must be applied into the cut parts before cutting the remaining sides or faces. When the articles are completely cut and polished, they are dipped into warm water or any suitable solvent of the cement; or the articles may be heated until the cement is decomposed or burned.

My invention is not to be confounded with the known process, which consists simply in fixing upon a metal or wood handle objects or articles too small to be held in the fingers—such as diamonds, small glass articles, &c.—as these or any glass articles to be cut are first covered with this cement to strengthen them, the manner of holding and cutting being no part of my invention.

I claim—

The herein-described process, consisting in coating glass articles to be cut with a cement or composition which becomes hard when dry, thereby holding the article firmly together, then cutting the desired design on the article while held by the cement, said cement overcoming the danger of breaking while cutting, and in then removing the cement, substantially as described.

Signed by me this 30th day of October, 1886.

EDUARD WEIS.

Witnesses:
MAURICE NELSON,
EDWARD HIRSCHY.